United States Patent
Okumichi et al.

(10) Patent No.: US 10,144,350 B2
(45) Date of Patent: Dec. 4, 2018

(54) LIGHTING FAILURE DETERMINATION APPARATUS AND LIGHTING FAILURE DETERMINATION METHOD

(71) Applicant: MITSUBISHI ELECTRIC CORPORATION, Tokyo (JP)

(72) Inventors: Kenji Okumichi, Tokyo (JP); Masamitsu Ishihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/525,998

(22) PCT Filed: Jan. 16, 2015

(86) PCT No.: PCT/JP2015/051013
§ 371 (c)(1),
(2) Date: May 11, 2017

(87) PCT Pub. No.: WO2016/113892
PCT Pub. Date: Jul. 21, 2016

(65) Prior Publication Data
US 2017/0305344 A1    Oct. 26, 2017

(51) Int. Cl.
*B60Q 11/00* (2006.01)
*G06K 9/46* (2006.01)
*G06T 5/20* (2006.01)
*G06T 7/00* (2017.01)

(52) U.S. Cl.
CPC .......... *B60Q 11/005* (2013.01); *G06K 9/4661* (2013.01); *G06T 5/20* (2013.01); *G06T 7/0004* (2013.01); *G06T 2207/10016* (2013.01); *G06T 2207/30252* (2013.01)

(58) Field of Classification Search
CPC ........ B60Q 11/005; G06K 9/4661; G06T 5/20
See application file for complete search history.

(56) References Cited

U.S. PATENT DOCUMENTS

2015/0092047 A1*  4/2015  Ryu .................. B60R 1/00
                                                348/135
2018/0066985 A1*  3/2018  Gut .................. G01J 1/4257

FOREIGN PATENT DOCUMENTS

| JP | 2010-6249 A | | 1/2010 |
| JP | 2010006249 A | * | 1/2010 |
| JP | 2010-137757 A | | 6/2010 |
| JP | 2013-32123 A | | 2/2013 |

* cited by examiner

Primary Examiner — Aaron L Troost
(74) Attorney, Agent, or Firm — Birch, Stewart, Kolasch & Birch, LLP

(57) ABSTRACT

It is an object of the present invention to provide a technology capable of increasing accuracy of determining a failure in a lighting device. A video acquisition unit acquires a video of an area including an illumination target area of a lighting device. A determination unit determines whether the lighting device is faulty on the basis of a video of the illumination target area of the video acquired by the video acquisition unit in cases in which an ON signal is supplied to the lighting device and a current position acquired by a position acquisition unit is a predetermined determination position where determination of a failure should be performed.

10 Claims, 13 Drawing Sheets

F I G . 1
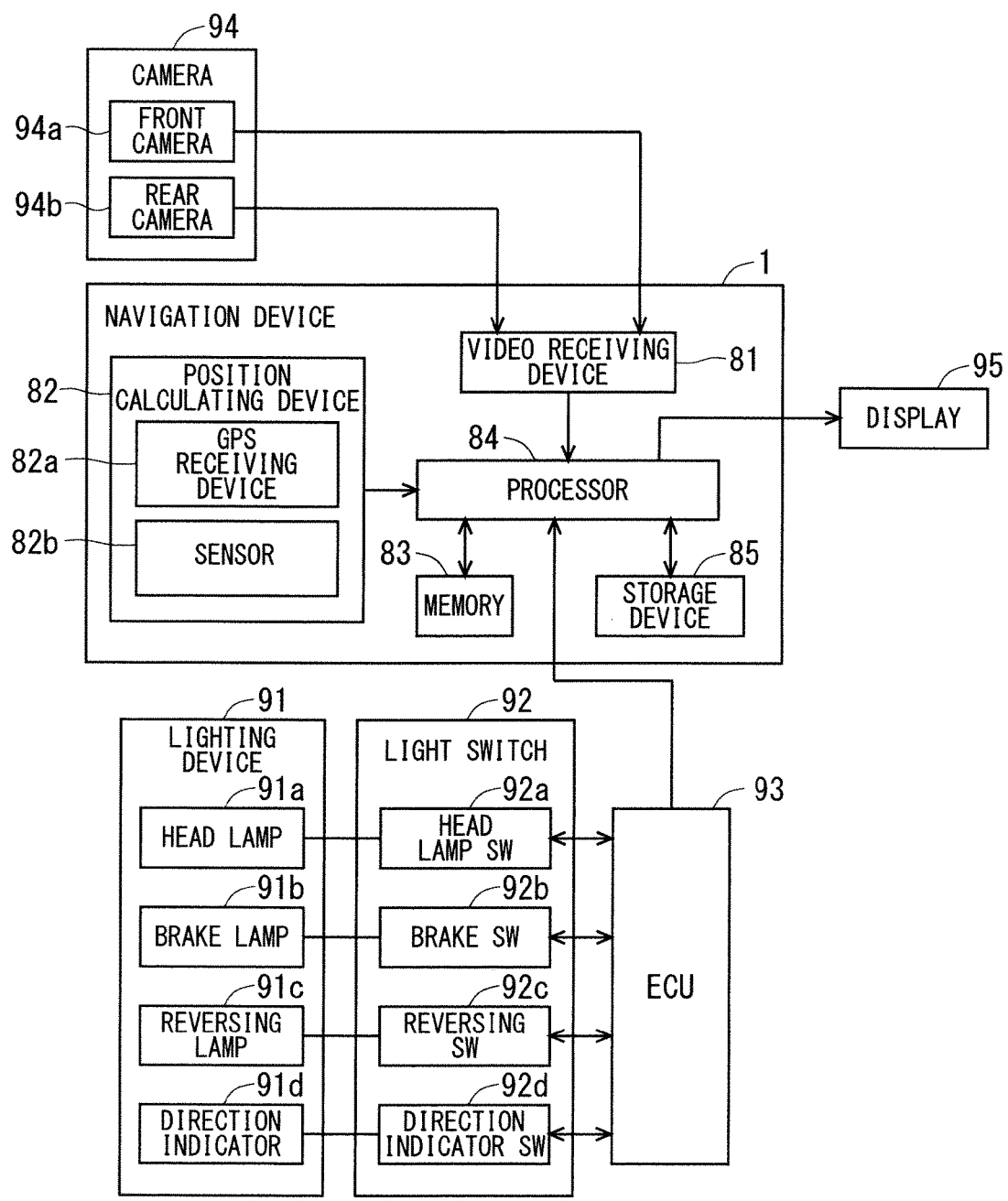

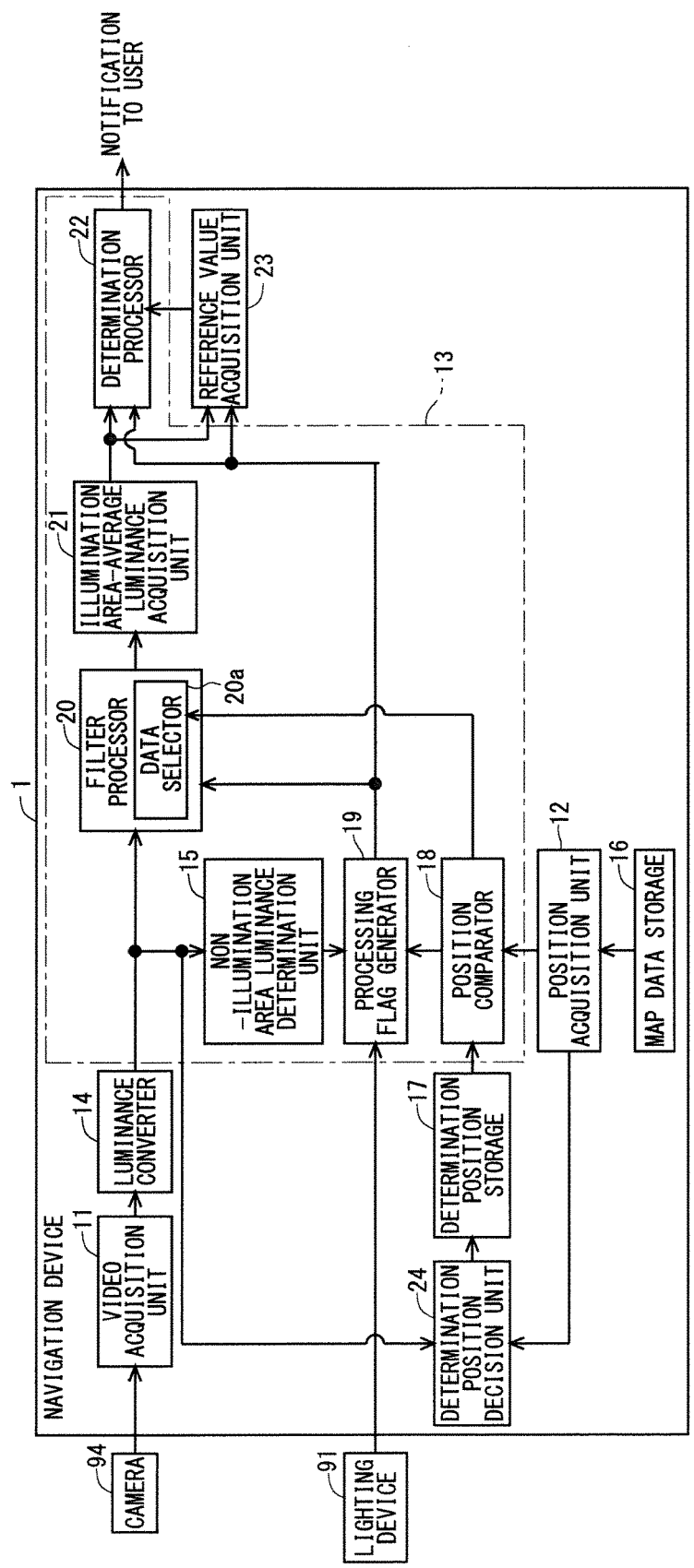
F I G. 1 3

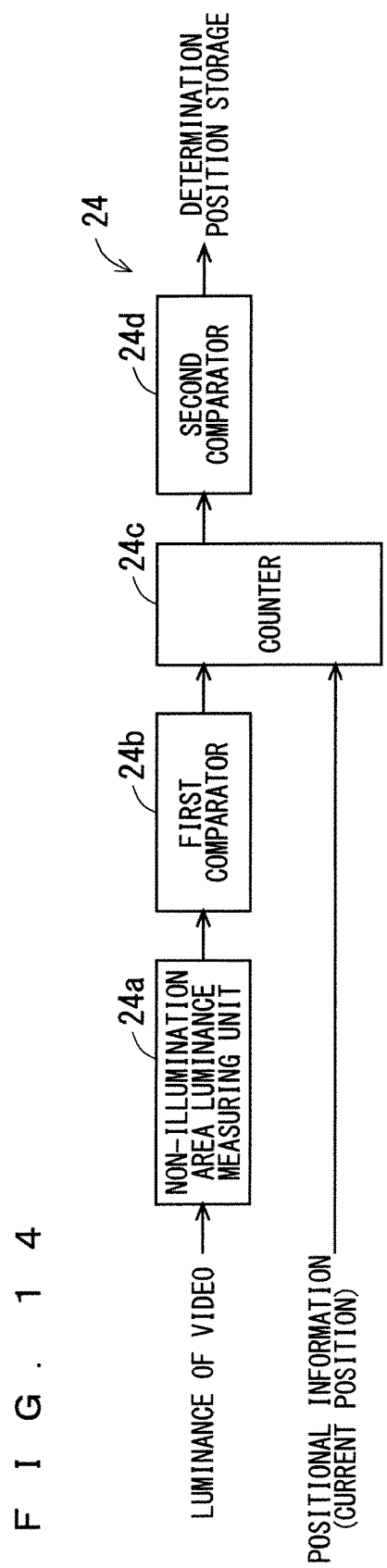

F I G. 1 7
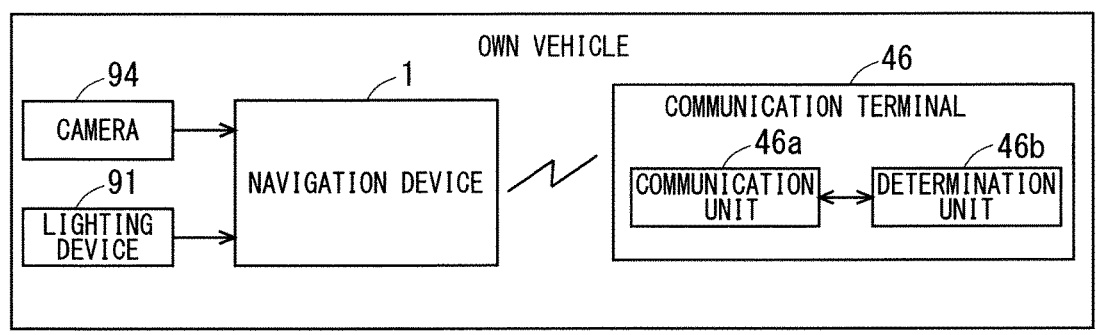

LIGHTING FAILURE DETERMINATION APPARATUS AND LIGHTING FAILURE DETERMINATION METHOD

TECHNICAL FIELD

The present technology relates to a lighting failure determination apparatus that determines a failure in a vehicle-mounted lighting device capable of illuminating the outside of a vehicle, and to a lighting failure determination method.

BACKGROUND ART

Failures in a vehicle-mounted lighting device have been determined (detected) on the basis of a current supplied to lamps of the lighting device. In contrast, a technique for determining failures in a lighting device on the basis of a video of the outside of a vehicle acquired with a vehicle-mounted camera has been proposed in recent times (for example, Patent Document 1). Moreover, a technique for determining failures in a lighting device on the basis of brightness around a vehicle detected by an illumination sensor and the presence or absence of detection of light of a lamp using a light guide cable has also been proposed.

PRIOR ART DOCUMENT

Patent Document

Patent Document 1: Japanese Patent Application Laid-Open No. 2010-137757

SUMMARY OF INVENTION

Problems to be Solved by the Invention

However, a condition of a road surface and the extent of reflection of light on the road surface vary with ambient environments, specifically, a place and a position, in which videos are acquired with a vehicle-mounted camera. Thus, although the lighting device has a fixed intensity of illumination, brightness of the videos captured by the vehicle-mounted camera and brightness detected by the illumination sensor also vary with the ambient environments. As a result, a failure in the lighting device cannot be determined accurately on the basis of brightness. Moreover, the use of the light guide cable makes the configuration complicated.

The present technology has been made in view of the above mentioned problems, and an object thereof is to provide a technology capable of increasing accuracy of determining a failure in a lighting device.

Means to Solve the Problems

A lighting failure determination apparatus according to the present invention determines a failure in a vehicle-mounted lighting device capable of illuminating the outside of a vehicle. The lighting failure determination apparatus comprises a video receiver to acquire a video of an area including an illumination target area of the lighting device, a position receiver to acquire a current position of the vehicle, and a determination controller to determine whether the lighting device is faulty on the basis of a video of the illumination target area of the video acquired by the video receiver in cases in which an ON signal is supplied to the lighting device and the current position acquired by the position receiver is a predetermined determination position where determination of the failure should be performed.

A lighting failure determination method is used for determining a failure in a vehicle-mounted lighting device capable of illuminating the outside of a vehicle. The lighting failure determination method comprises acquiring a video of an area including an illumination target area of the lighting device, acquiring a current position of the vehicle, and determining whether the lighting device is faulty on the basis of a video of the illumination target area of the video acquired in cases in which an ON signal is supplied to the lighting device and the current position acquired is a predetermined determination position where determination of the failure should be performed.

Effects of the Invention

The present invention can increase the accuracy of determining a failure in the lighting device.

These and other objects, features, aspects and advantages of the present technology will become more apparent from the following detailed description of the present technology when taken in conjunction with the accompanying drawings.

BRIEF DESCRIPTION OF DRAWINGS

FIG. 1 is a block diagram showing a hardware configuration of a navigation device according to a first embodiment.

FIG. 13 is a block diagram showing a functional configuration of a navigation device according to a second modification.

FIG. 14 is a block diagram showing a configuration of a determination position decision unit according to the second modification.

FIG. 17 is a block diagram showing a configuration of a communication terminal according to the other modification.

DESCRIPTION OF EMBODIMENTS

First Embodiment

Figure 2:
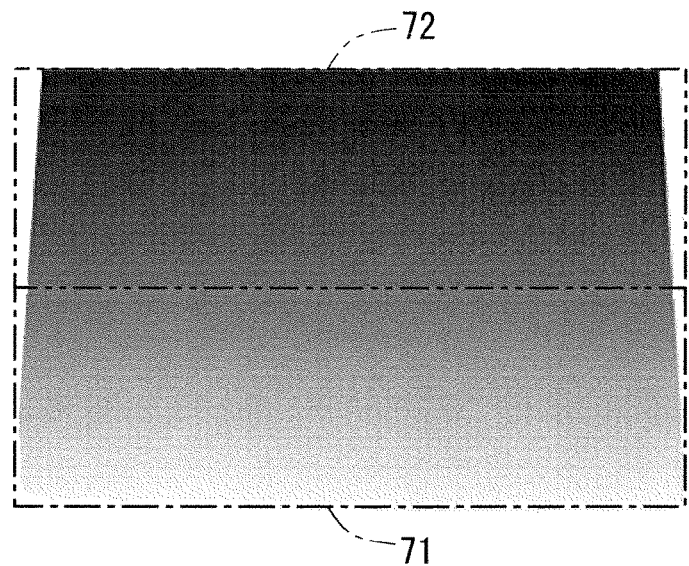
FIG. 2 is a diagram showing an example of a video acquired with a camera according to the first embodiment.

In the following description, application of a lighting failure determination apparatus according to the present invention as one function of a vehicle-mountable navigation device will be described as an example. Hereinafter, a vehicle on which the navigation device is mounted and attention is focused is referred to as an "own vehicle" in the description.

<Hardware Configuration>

FIG. 1 is a block diagram showing a hardware configuration of a navigation device 1 according to a first embodiment. The navigation device 1 in FIG. 1 is connected to a lighting device 91 through a light switch 92 and an electronic control unit (ECU) 93 while being connected to a camera 94 and a display 95.

As seen from the following description, the navigation device 1 can determine a failure (such as a burned-out lamp) in the lighting device 91 on the basis of a video acquired with the camera 94. Structural components connected to the navigation device 1 will be each described in detail before the configuration of the navigation device 1 is described here in detail.

The lighting device 91 is mounted on the own vehicle and is capable of illuminating the outside of the own vehicle. Specifically, an ON signal supplied to the lighting device 91 without failures causes the lighting device 91 to illuminate the outside of the own vehicle. The lighting device 91 in FIG. 1 includes lamps of a plurality of kinds such as a head lamp 91a, a brake lamp 91b, a reversing lamp 91c supplied with the ON signal when the own vehicle rolls backward, and a direction indicator 91d. The lighting device 91 is not limited to these, and may have a configuration including at least one of these lamps or a configuration including additional lamps of the same kinds as the kinds of these lamps (such as a tail lamp).

The light switch 92 supplies the ON signal to the lighting device 91 in response to the control of the ECU 93. The light switch 92 in FIG. 1 includes a head lamp switch (SW) 92a, a brake switch (SW) 92b, a reversing switch (SW) 92c, and a direction indicator switch (SW) 92d that can supply the ON signal to the head lamp 91a, the brake lamp 91b, the reversing lamp 91c, and the direction indicator 91d, respectively. The light switch 92 is not limited to these, and it suffices that the light switch 92 includes a switch corresponding to a lamp of the lighting device 91.

The ECU 93 collectively controls the own vehicle body. The ECU 93 transmits information indicating whether the light switch 92 has supplied the ON signal to the lighting device 91 to the navigation device 1 via, for example, a controller area network (CAN).

The camera 94 acquires a video and generates data of the video.

FIG. 2 is a diagram showing an example of a video acquired with the camera 94. As shown in FIG. 2, an area of the video acquired with the camera 94 includes an illumination target area 71 of the lighting device 91 and a non-illumination target area 72 of the lighting device 91.

The illumination target area 71 is an area where illumination with light from the lighting device 91 is expected when the lighting device 91 without failures receives the ON signal. The non-illumination target area 72 is an area where illumination with light from the lighting device 91 is not expected even when the lighting device 91 without failures receives the ON signal. The non-illumination target area 72 is not necessary, and a failure in the lighting device 91 can be determined even if the area of the video acquired with the camera 94 does not include the non-illumination target area 72.

Referring back to FIG. 1, a front camera 94a and a rear camera 94b are applied as the camera 94 that acquires the above-mentioned video. The front camera 94a is located on the front side of the own vehicle and acquires a video of the area including the illumination target area 71 of the head lamp 91a and the direction indicator 91d. The rear camera 94b is located on the rear side of the own vehicle and acquires a video of the area including the illumination target area 71 of the brake lamp 91b, the reversing lamp 91c, and the direction indicator 91d. It is assumed that a camera for the purpose other than failure determination of the lighting device 91, for example, a camera for recording an accident and a theft, is applied as the camera 94, but a special camera used for the failure determination of the lighting device 91 is certainly applicable.

The display 95 includes, for example, a liquid crystal display and displays various pieces of information by the control of the navigation device 1.

Next, the hardware configuration of the navigation device 1 in FIG. 1 will be described. The navigation device 1 includes a video receiving device 81, a position calculating device 82, a memory 83, a processor 84, and a storage device 85.

The video receiving device 81 includes, for example, an interface and receives the video acquired with the camera 94 (video of the area including the illumination target area 71 of the lighting device 91) from the camera 94.

The position calculating device 82 calculates a current position of the own vehicle. In an example of FIG. 1, the position calculating device 82 includes a Global Positioning System (GPS) receiving device 82a and a sensor 82b. The GPS receiving device 82a receives a GPS signal for calculating the current position of the own vehicle from a GPS satellite. The sensor 82b includes, for example, a gyro sensor and a speed sensor and detects an azimuth direction and a speed of the own vehicle to calculate the current position of the own vehicle. The configuration of the position calculating device 82 is not limited to this, and, for example, the position calculating device 82 may have any one of the configurations. The process of calculating the position may be performed by the processor 84 on the basis of the GPS signal and the sensor data.

The memory 83 includes, for example, a semiconductor memory. The storage device 85 includes, for example, a hard disk drive (HDD). The memory 83 and the storage device 85 (hereinafter referred to as "the memory 83 or the like") store information necessary for the navigation device 1 to have a navigation function and a lighting failure determination function. The processor 84 includes, for example, a central processing unit (CPU) or the like included in a module of a system-on-a-chip (SoC) or a system large scale integration (LSI).

<Functional Configuration>

Figure 3:
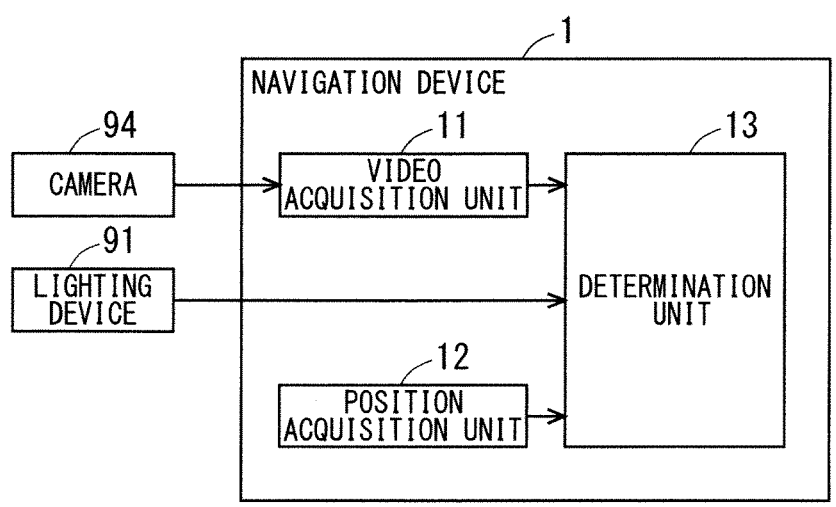
FIG. 3 is a block diagram showing a functional configuration of the navigation device according to the first embodiment.

FIG. 3 is a block diagram showing a functional configuration of the navigation device 1 according to the first embodiment. The representation of the light switch 92, the ECU 93, and the display 95 is omitted from the drawings after FIG. 3.

The navigation device 1 in FIG. 3 includes a video acquisition unit 11, a position acquisition unit 12, and a determination unit 13. The video acquisition unit 11 corresponds to, for example, the video receiving device 81 in FIG. 1. The position acquisition unit 12 corresponds to, for example, the position calculating device 82 in FIG. 1. The processor 84 in FIG. 1, for example, executes programs stored in the memory 83 or the like to achieve the determination unit 13 as the function of the processor 84. Note that the determination unit 13, which is not limited to the configuration above, may be achieved by a plurality of processors 84 interfacing therebetween.

Next, the functional configuration of the navigation device 1 according to the first embodiment will be described in detail. The video acquisition unit 11 acquires the video of the area including the illumination target area 71 of the lighting device 91 as shown in FIG. 2. The position acquisition unit 12 acquires the current position of the own vehicle.

The determination unit 13 determines whether the lighting device 91 is faulty on the basis of a video of the illumination target area 71 of the video acquired by the video acquisition unit 11 in cases in which the ON signal is supplied to the lighting device 91 and the current position acquired by the position acquisition unit 12 is a determination position. When the determination unit 13 determines that the lighting device 91 is faulty, the determination result is displayed on the display 95 in FIG. 1.

Conclusion of First Embodiment

The navigation device 1 according to the first embodiment as described above determines whether the lighting device 91 is faulty on the basis of the video acquired by the video acquisition unit 11 in the case in which the current position of the own vehicle is the predetermined determination position. Thus, the position in which the video used for the failure determination of the lighting device 91 is acquired can be limited to the determination position, allowing for uniform ambient environments such as a condition of a road surface and the extent of reflection of light on the road surface. This can reduce an influence of the ambient environments on brightness of the video acquired by the video acquisition unit 11, so that the accuracy of the failure determination of the lighting device 91 on the basis of the video can be increased.

Second Embodiment

Figure 4:
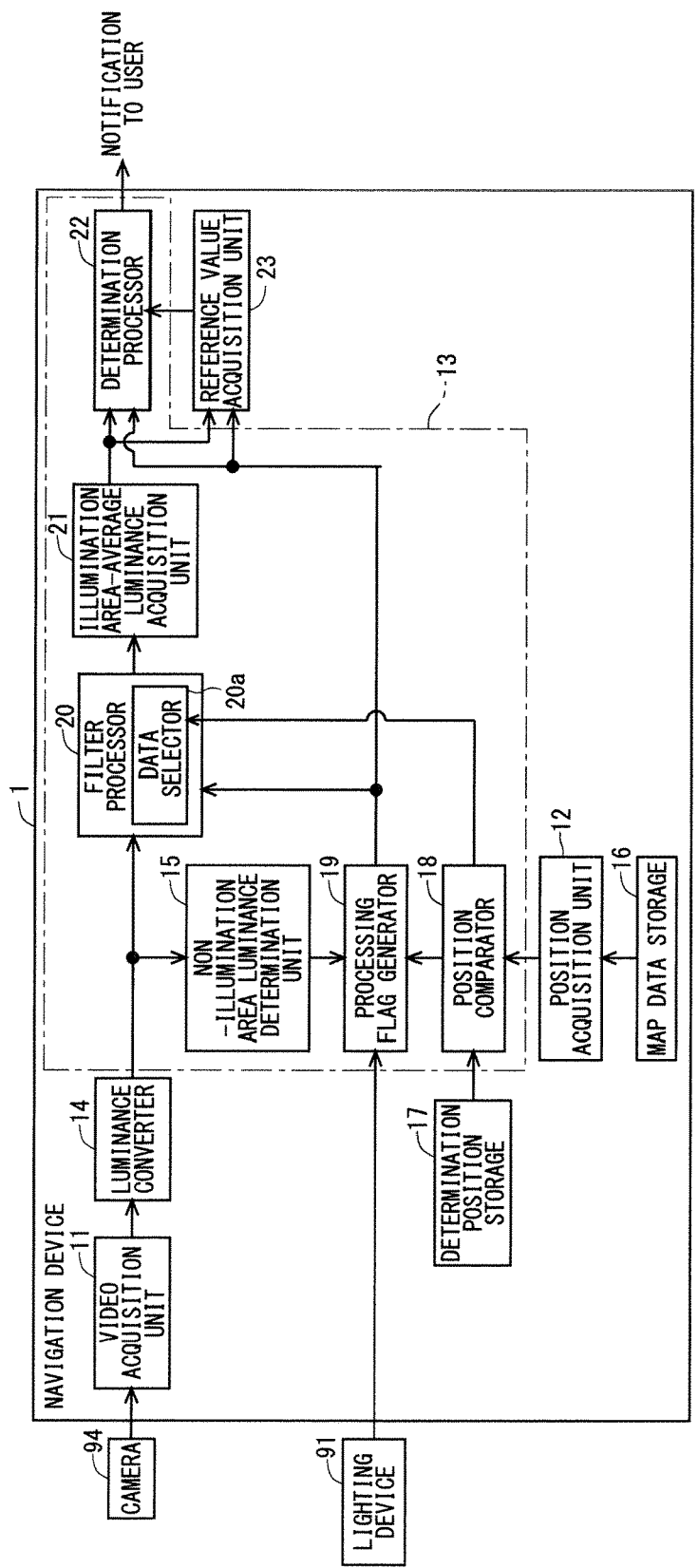
FIG. 4 is a block diagram showing a functional configuration of a navigation device according to a second embodiment.

FIG. 4 is a block diagram showing a functional configuration of a navigation device 1 according to a second embodiment of the present invention. In the navigation device 1 according to the second embodiment, the same or similar components as those described above are denoted by the same references, and the differences will be mainly described.

The navigation device 1 according to the second embodiment includes a luminance converter 14, a map data storage 16, a determination position storage 17, and a reference value acquisition unit 23 in addition to the configuration in FIG. 3. The determination unit 13 according to the second embodiment includes a non-illumination area luminance determination unit 15, a position comparator 18, a processing flag generator 19, a filter processor 20, an illumination area-average luminance acquisition unit 21, and a determination processor 22. The map data storage 16 and the determination position storage 17 correspond to at least one of the memory 83 and the storage device 85 in FIG. 1. The luminance converter 14 and the reference value acquisition unit 23 are achieved as the functions of the processor 84 in FIG. 1 similarly to the determination unit 13.

An overview will be described below before structural components according to the second embodiment are described in detail.

Information indicating whether the ON signal is supplied to the lighting device 91, information indicating whether the current position acquired by the position acquisition unit 12 is the determination position, and information indicating whether a luminance of the non-illumination target area 72 (FIG. 2) is greater than a predetermined threshold value are output to the processing flag generator 19. The processing flag generator 19 determines whether the failure determination of the lighting device 91 is performed on the basis of the information.

When the processing flag generator 19 determines that the failure determination of the lighting device 91 is performed, the filter processor 20 performs filter processing on a luminance of the video acquired by the video acquisition unit 11, and the illumination area-average luminance acquisition unit 21 calculates (acquires) an average value of the luminance in the illumination target area 71 (FIG. 2) of the luminance on which the filter processing is performed by the filter processor 20. Then, the determination processor 22 determines whether the lighting device 91 is faulty on the basis of the average value calculated by the illumination area-average luminance acquisition unit 21 and a predetermined reference value.

Next, the structural components according to the second embodiment will be described in detail.

The luminance converter 14 converts the video acquired by the video acquisition unit 11 to information about the luminance of the video, and the information about the luminance is output to the non-illumination area luminance determination unit 15 and the filter processor 20. Hereinafter, the information about the luminance output from the luminance converter 14 may be described as "the luminance of the video acquired by the video acquisition unit 11."

The non-illumination area luminance determination unit 15 determines whether the luminance of the video of the non-illumination target area 72 (FIG. 2) of the luminance of the video acquired by the video acquisition unit 11 is greater than the predetermined threshold value. The non-illumination area luminance determination unit 15 then outputs the determination result to the processing flag generator 19. The predetermined threshold value may be appropriately modified by, for example, a user or a learning function of the device.

The map data storage 16 stores map data. The position acquisition unit 12 according to the second embodiment not only acquires the current position of the own vehicle on the basis of the GPS signal, the current azimuth direction of the own vehicle, and the current speed of the own vehicle, but also performs map matching with the map data stored in the map data storage 16. This increases the accuracy of detecting the current position of the own vehicle. In the following description, the current position is assumed as a latitude and a longitude to which the current position is not limited.

Figure 5:
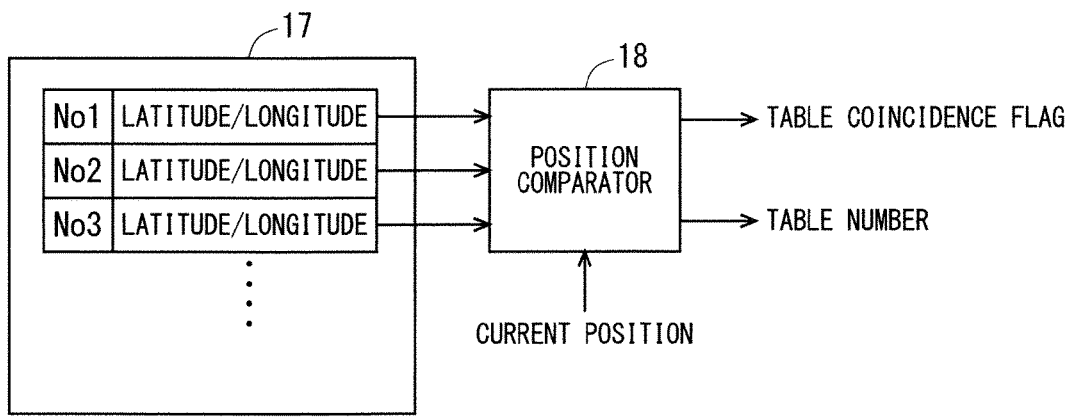
FIG. 5 is a block diagram showing a configuration of a determination position storage and a position comparator according to the second embodiment.

FIG. 5 is a block diagram showing a configuration of the determination position storage 17 and the position comparator 18 according to the second embodiment.

The determination position storage 17 stores the latitude and the longitude of predetermined determination positions in a table format. The determination position storage 17 stores different determination positions with different table numbers (No1, No2, . . . ) and allows the determination positions to be identified by the table numbers.

The position comparator 18 determines whether the current position (the latitude and the longitude) of the own vehicle acquired by the position acquisition unit 12 is the determination position (the latitude and the longitude) stored in the determination position storage 17. When the position comparator 18 determines that the current position of the own vehicle is the determination position, the position comparator 18 outputs a table coincidence flag indicating that the current position of the own vehicle coincides with the determination position to the processing flag generator 19, and outputs the table number of the determination position to the filter processor 20.

Referring back to FIG. 4, the processing flag generator 19 can receive the information indicating whether the ON signal is supplied to the lighting device 91, the table coincidence flag, and the determination result of the non-illumination area luminance determination unit 15, which are described above.

When receiving the information indicating that the ON signal is supplied to the lighting device 91 and receiving the table coincidence flag from the position comparator 18, the processing flag generator 19 outputs a processing flag indicating that the filter processing is performed to the filter processor 20. Note that the processing flag generator 19 according to the second embodiment is not allowed to output the processing flag to the filter processor 20 in the case in which the luminance of the video of the non-illumination target area is greater than the predetermined threshold value even when the processing flag generator 19 receives the information indicating that the ON signal is supplied to the lighting device 91 and receives the table coincidence flag from the position comparator 18.

In other words, the processing flag generator 19 outputs the processing flag to the filter processor 20 in the cases in which the processing flag generator 19 receives the information indicating that the ON signal is supplied to the lighting device 91 and the table coincidence flag from the position comparator 18, and the luminance of the video of the non-illumination target area is less than or equal to the predetermined threshold value. As a result, the processing is performed downstream of the filter processor 20, and the failure determination of the lighting device 91 is performed.

On the other hand, the processing flag generator 19 does not output the processing flag to the filter processor 20 in cases other than the case above. As a result, the processing is not performed downstream of the filter processor 20 not to perform the failure determination of the lighting device 91.

The filter processing 20 when receiving the processing flag from the processing flag generator 19 performs the filter processing with a low-pass filter in a time direction on the luminance of pixels in the video acquired by the video acquisition unit 11. The filter processing reduces a change in the luminance in the time direction, so that an influence of noise in the luminance can be suppressed while simplified information indicating that the illumination target area is bright and the non-illumination target area is dark can be obtained.

Then, the video acquisition unit 11 is configured to acquire the video in FIG. 2 every moment, and the filter processor 20 performs the filter processing with the low-pass filter in the time direction on the luminance of the pixels in the video acquired every moment by the video acquisition unit 11 in the second embodiment. To achieve such filter processing, it may be designed such that a video having a plurality of frames can be acquired while the own vehicle is passing a measurement position. For example, it may be designed such that a range of the measurement position is sufficiently wide or the speed at which the video is acquired is sufficiently fast.

Figure 6:
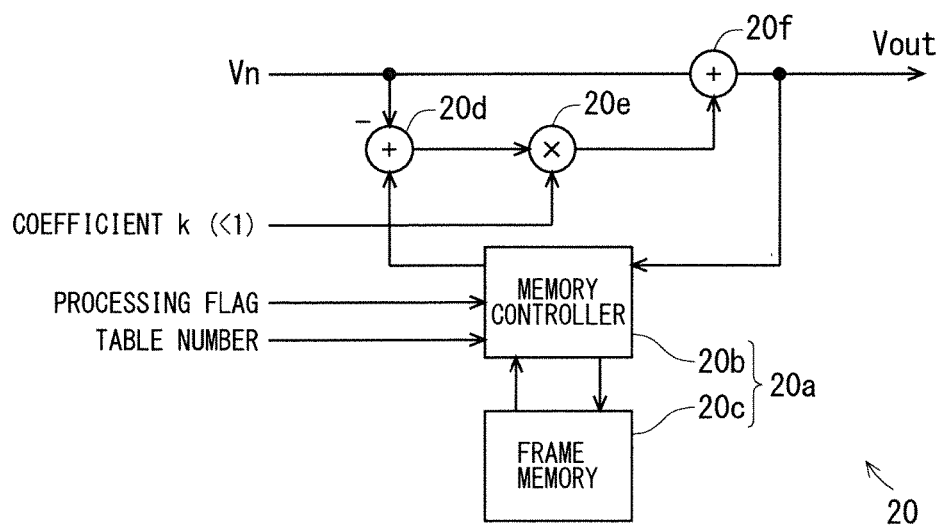
FIG. 6 is a block diagram showing a configuration of a filter processor according to the second embodiment.

FIG. 6 shows an integrated infinite impulse response (IIR) filter, which is a kind of low-pass filters, as an example of a configuration of the filter processor 20 according to the second embodiment.

The filter processor 20 includes a data selector 20a, a subtracter 20d, a multiplier 20e, and an adder 20f. The data selector 20a among them includes a memory controller 20b and a frame memory 20c for a delay of one frame.

The subtracter 20d receives an input of a luminance (input Vn) of the video from the video acquisition unit 11 and an input of a filter-processed luminance (output Vout), which is a luminance of a preceding frame of the input Vn. The subtracter 20d subtracts the input Vn from the output Vout, and the multiplier 20e multiplies the value obtained from the subtraction by the subtracter 20d by a coefficient k (k<1). The adder 20f adds the value obtained from the multiplication by the multiplier 20e to the input Vn, and the value obtained from the addition is output as the output Vout.

The memory controller 20b receives an input of the table number from the position comparator 18. The memory controller 20b writes the filter-processed luminance (output Vout) of the filter processor 20 to a storage area corresponding to the table number among a plurality of storage areas of the frame memory 20c. The memory controller 20b reads the written output Vout from the frame memory 20c and outputs the output Vout to the subtracter 20d. The above-mentioned processing of the filter processor 20 is performed on a pixel-by-pixel basis. Thus, the filter processor 20 can perform the integration processing in the time direction on the luminance on the pixel-by-pixel basis for each of the table numbers, namely, each of the measurement positions.

The memory controller 20b not only receives an input of the table number from the above-mentioned position comparator 18 but also an input of the processing flag from the processing flag generator 19. The memory controller 20b performs the above-mentioned writing when the processing flag is input to the memory controller 20b, and does not perform the above-mentioned writing when the processing flag is not input to the memory controller 20b. As a result, the filter processor 20 when receiving the processing flag is configured to perform the filter processing with the low-pass filter while the filter processor 20 when not receiving the processing flag is configured not to perform the filter processing with the low-pass filter.

The example of the application of the integrated IIR filter to the filter processor 20 is described above. However, the filter processor 20 is not limited to the configuration above, and the other low-pass filters such as a Chebyshev filter, a Butterworth filter, and a Bessel filter may be applied to the filter processor 20. Furthermore, the luminance in the non-illumination target area 72 (FIG. 2) is not a processed target in the illumination area-average luminance acquisition unit 21 located downstream of the filter processor 20. Thus, the filter processor 20 may perform the filter processing only on the luminance in the illumination target area 71 (FIG. 2) so as to reduce a load on the computation.

Referring back to FIG. 4, the illumination area-average luminance acquisition unit 21 calculates (acquires) an average value of the above-mentioned filter-processed luminance of the pixels in a predetermined area of the illumination target area 71.

Figure 7:
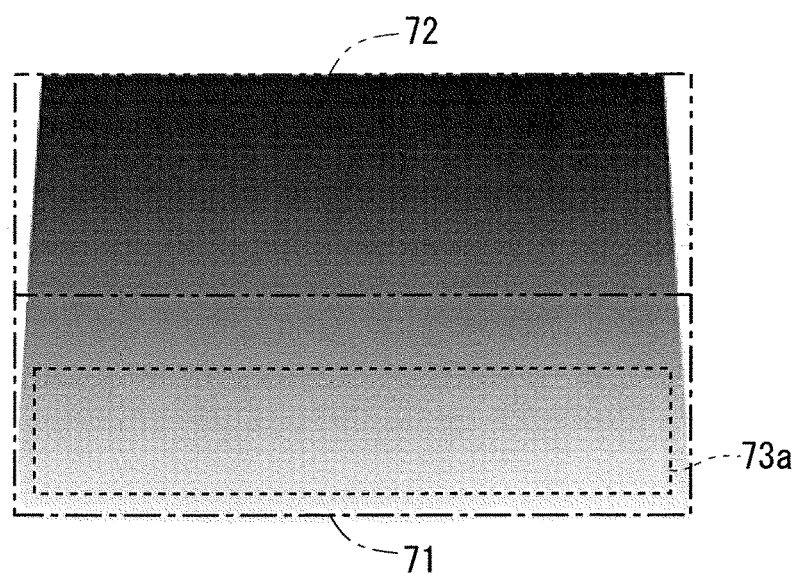
FIG. 7 is a diagram showing a calculated target area according to the second embodiment.
Figure 8:
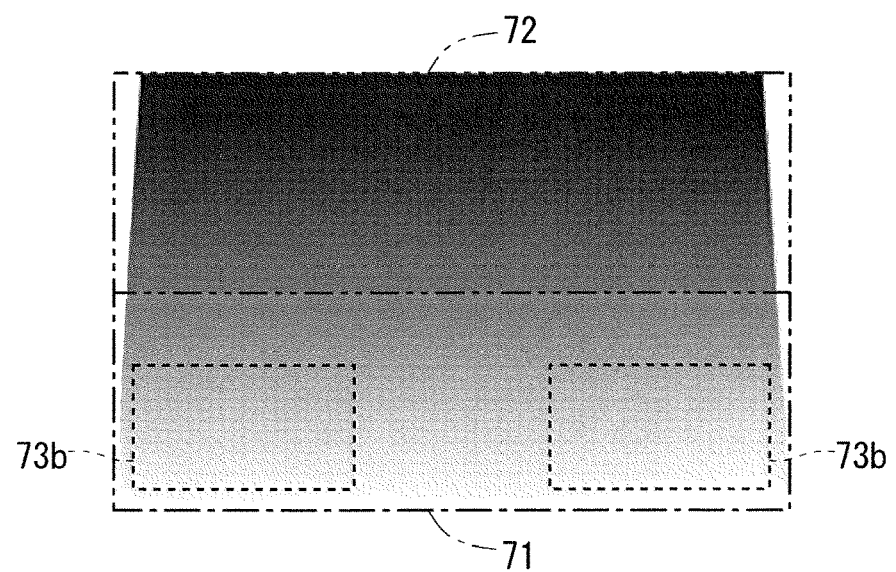
FIG. 8 is a diagram showing the calculated target area according to the second embodiment.

FIGS. 7 and 8 are diagrams showing an example of the above-mentioned predetermined area (hereinafter referred to as a "calculated target area") that is a target whose average value is calculated by the illumination area-average luminance acquisition unit 21. FIG. 7 shows a calculated target area 73a in a case in which targets for the failure determination are the head lamp 91a, the brake lamp 91b, and the reversing lamp 91c in FIG. 1. FIG. 8 shows a calculated target area 73b in a case in which a target for the failure determination is the direction indicator 91d in FIG. 1.

The calculated target area 73a in FIG. 7 is set to the entire illumination target area 71 from the left portion to the right portion in consideration of a tendency of the luminance of the head lamp 91a or the like to be high in the entire illumination target area 71 from the left to the right. On the other hand, the calculated target area 73b in FIG. 8 is set to the left portion and the right portion unevenly distributed in the illumination target area 71 in consideration of a tendency of the luminance of the direction indicator 91d to be high in the left portion and the right portion unevenly distributed in the illumination target area 71. In this manner, the calculated target areas 73a, 73b are defined for each kind of the lamps in the second embodiment.

Referring back to FIG. 4, the determination processor 22 determines whether the lighting device 91 is faulty on the basis of the average value (hereinafter referred to as an "average luminance") acquired by the illumination area-average luminance acquisition unit 21 and the predetermined reference value. The determination processor 22 according to the second embodiment performs the determination for each kind of the lamps of the lighting device 91.

Figure 9:
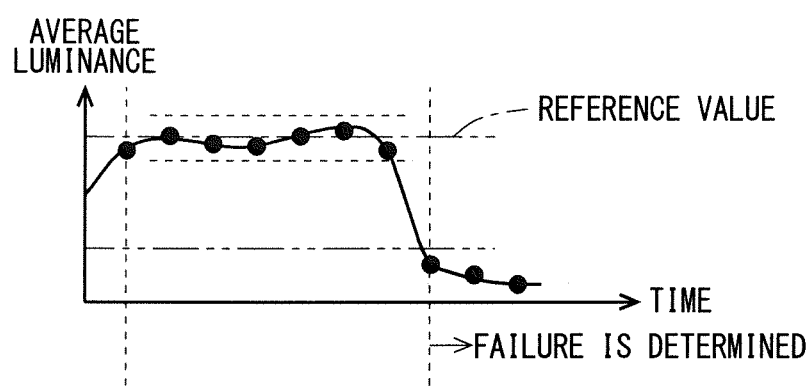
FIG. 9 is a diagram for describing determination processing of a determination processor according to the second embodiment.

FIG. 9 is a diagram for describing determination processing of the determination processor 22 according to the second embodiment. The determination processor 22 determines whether the average luminance is less than or equal to a value (value corresponding to the chain double-dashed line in FIG. 9) of n (n<100) % of the reference value corresponding to the alternate long and short dashed line in FIG. 9. The determination processor 22 determines that the lighting device 91 is faulty when determining that the average luminance is less than or equal to the value of n % of the reference value; otherwise, the determination processor 22 determines that the lighting device 91 is not faulty. When the determination processor 22 determines that the lighting device 91 is faulty, the display 95 in FIG. 1 displays that the lighting device 91 is faulty and displays the kind of the faulty lamp.

The determination processing is not limited to the above-mentioned processing. For example, it may be determined that the lighting device 91 is faulty when an average luminance of consecutive videos of several frames is less than or equal to the value of n % of the reference value; otherwise, it may not be determined that the lighting device 91 is faulty. Such a configuration can reduce errors of the determination.

Referring back to FIG. 4, in a case in which an average luminance of units of a predetermined plurality of frames before the present falls within a range of allowable variation (a predetermined range), the reference value acquisition unit 23 calculates the reference value used in the determination processor 22 on the basis of the average luminance of the units of the predetermined plurality of frames. Hereinafter, the units of the predetermined plurality of frames are described as units of m (m is an integer greater than or equal to two) frames.

Figure 10:
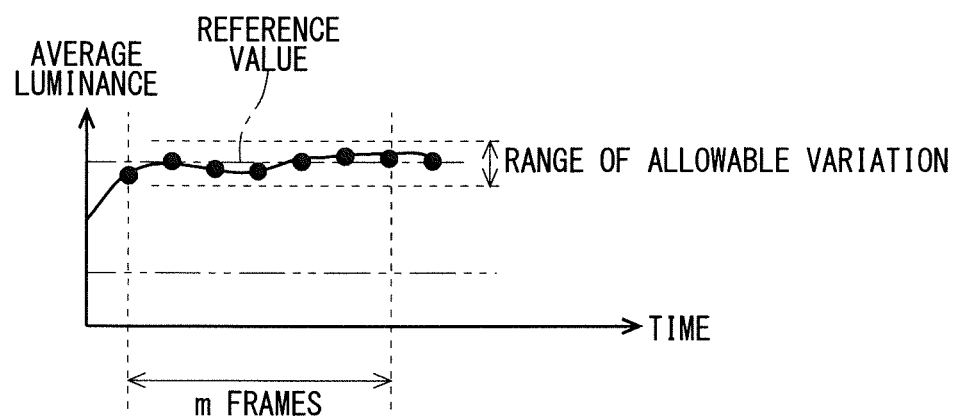
FIG. 10 is a diagram for describing calculating processing of a reference value acquisition unit according to the second embodiment.

FIG. 10 is a diagram for describing calculating processing of the reference value acquisition unit 23 according to the second embodiment. The range of allowable variation defined by the broken lines in FIG. 10 may be appropriately modified by, for example, a user or a learning function of the device with reference to a preceding reference value.

The reference value acquisition unit 23 stands by without calculating the reference value until variation in the average luminance from the illumination area-average luminance acquisition unit 21 is stabilized. For the standby time, the determination processor 22 may stand by without performing the failure determination or may perform the failure determination using a default reference value.

The reference value acquisition unit 23 determines that the variation is stabilized in the case in which the average luminance of the consecutive m frames falls within the range of allowable variation, and calculates the reference value on the basis of the average luminance of the m frames. For example, the reference value acquisition unit 23 calculates an average value, a median value, or a mode of the average luminance of the m frames as the reference value. The reference value may be calculated after the integration processing in the time direction on the average luminance to reduce the variation in the average luminance used for the calculation. The reference value acquisition unit 23 sets the reference value calculated for the first time as the reference value used in the determination processor 22.

After the reference value is set, the reference value acquisition unit 23 calculates a reference value in a similar manner described above in a case in which a new average luminance from the illumination area-average luminance acquisition unit 21 falls within the range of allowable variation (or in a case in which the new average luminance is greater than n % of the reference value). The reference value acquisition unit 23 then updates the reference value used in the determination processor 22 with the reference value calculated for the second and subsequent times.

<Operations>

Figure 11:
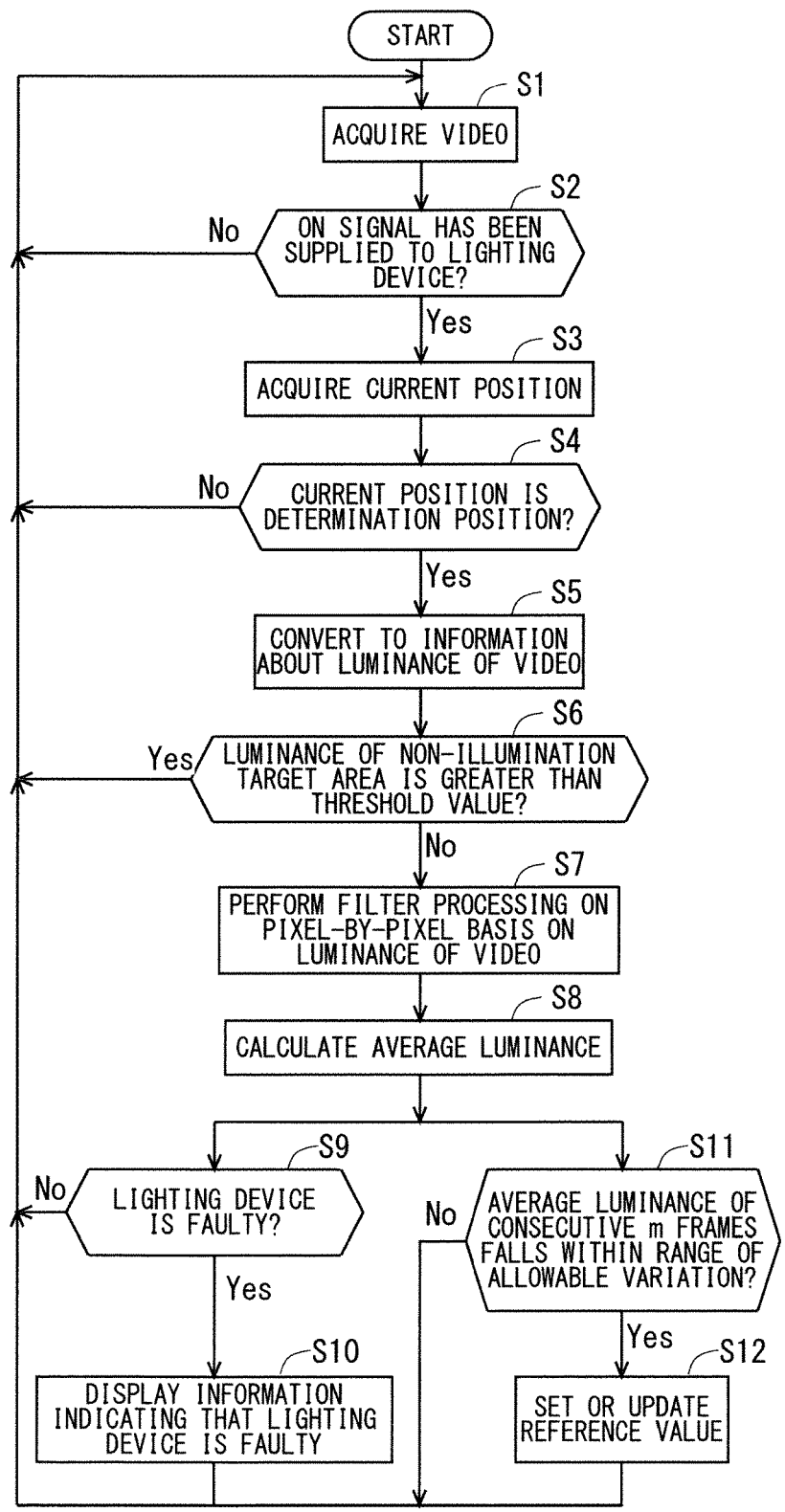
FIG. 11 is a flowchart showing operations of the navigation device according to the second embodiment.

FIG. 11 is a flowchart showing operations of the navigation device 1 according to the second embodiment. Operations in FIG. 11 start after the activation of the navigation device 1, for example.

First, in Step S1, the video acquisition unit 11 acquires the video as shown in FIG. 2 from the camera 94.

In Step S2, the processing flag generator 19 refers to the information indicating whether the ON signal is supplied to the lighting device 91. If the information indicates that the ON signal is supplied to the lighting device 91, continue to Step S3; otherwise, return to Step S1.

In Step S3, the position acquisition unit 12 acquires the current position of the own vehicle.

In Step S4, the position comparator 18 determines whether the current position of the own vehicle acquired by the position acquisition unit 12 is the determination position stored in the determination position storage 17. If it is determined that the current position of the own vehicle is the determination position, continue to Step S5; otherwise, return to Step S1.

In Step S5, the luminance converter 14 converts the video acquired by the video acquisition unit 11 to the information about the luminance of the video.

In Step S6, the non-illumination area luminance determination unit 15 determines whether the luminance of the video of the non-illumination target area 72 (FIG. 2) is greater than the predetermined threshold value. If it is determined that the luminance is greater than the predetermined threshold value, return to Step S1; otherwise, continue to Step S7.

In Step S7, the processing flag generator 19 outputs the processing flag to the filter processor 20, and the filter processor 20 performs the filter processing with the low-pass filter in the time direction on the pixel-by-pixel basis on the luminance of the video acquired by the video acquisition unit 11.

In Step S8, the illumination area-average luminance acquisition unit 21 calculates the average luminance, namely, the average value of the filter-processed luminance of the pixels in the calculated target area. Subsequently, continue to Step S9 and Step S11.

In Steps S9 and S10, the failure determination processing or the like is performed. Specifically, in Step S9, the determination processor 22 determines whether the lighting device 91 is faulty on the based on the average luminance and the reference value. If it is determined that the lighting device 91 is faulty, continue to Step S10 and return to Step S1 after the information indicating that the lighting device 91 is faulty is displayed. If it is determined that the lighting device 91 is not faulty, return to Step S1 without continuing to Step S10.

In Steps S11 and S12, setting, updating, or the like of the reference value is performed. Specifically, in Step S11, the reference value acquisition unit 23 determines whether the average luminance of the consecutive m frames falls within the range of allowable variation. If it is determined that the average luminance falls within the range of allowable variation, continue to Step S12 and return to Step S1 after the reference value is calculated and set or updated. If it is determined that the average luminance does not fall within the range of allowable variation, return to Step S1 without continuing to Step S12.

Conclusion of Second Embodiment

The navigation device 1 according to the second embodiment as described above can limit the position in which the video used for the failure determination of the lighting device 91 is acquired to the determination position similarly to the first embodiment, thereby resulting in a reduced influence of the ambient environments. Thus, the accuracy of the failure determination of the lighting device 91 on the basis of the video can be increased.

The second embodiment does not perform the failure determination of the lighting device 91 in the case in which the luminance of the video of the non-illumination target area is greater than the predetermined threshold value. For this reason, the failure determination of the lighting device 91 is not performed in the evening when the illumination target area 71 is bright where it may be mistakenly determined that the lighting device 91 is not faulty even though the lighting device 91 is faulty. Thus, the accuracy of the failure determination of the lighting device 91 can be increased.

Further, the second embodiment performs the filter processing with the low-pass filter in the time direction on the luminance of the plurality of pixels in the video acquired by the video acquisition unit 11, and performs the failure determination of the lighting device 91 on the basis of the average value of the filter-processed luminance and the reference value. This can reduce an influence of sudden noise, so that the accuracy of the failure determination of the lighting device 91 can be increased.

The second embodiment calculates, in the case in which the average luminance of the units of the m frames before the present falls within the range of allowable variation, the reference value on the basis of the average luminance of the units of the above-mentioned m frames. Therefore, the failure determination of the lighting device 91 can be performed with the appropriate reference value, allowing for the increased accuracy of the failure determination.

Further, the second embodiment defines the calculated target areas 73a, 73b (FIGS. 7 and 8) for each kind of the lamps. Therefore, an influence of the luminance in an unnecessary area can be reduced, allowing for the increased accuracy of the failure determination of the lighting device 91.

<First Modification>

The position comparator 18 determines whether the current position acquired by the position acquisition unit 12 is the determination position stored in the determination position storage 17. However, this is not restrictive, and the position comparator 18 may further determine whether a current direction (azimuth direction) of the own vehicle acquired by the position acquisition unit 12 is a predetermined direction with respect to the determination position.

Figure 12:
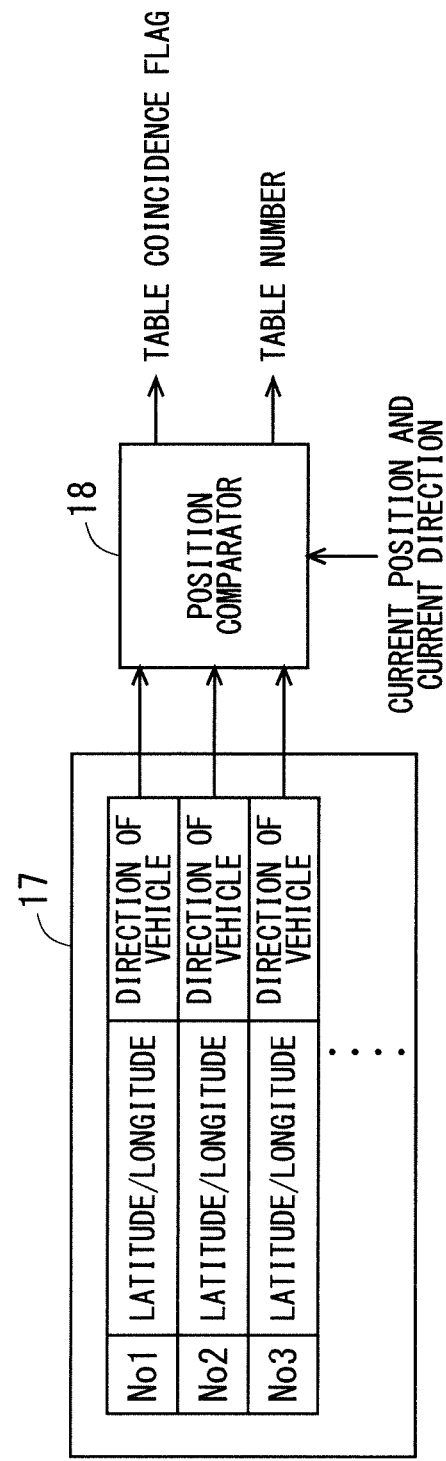
FIG. 12 is a block diagram showing a configuration of a determination position storage and a position comparator according to a first modification.

FIG. 12 is a block diagram showing a configuration of a determination position storage 17 and a position comparator 18 according to a first modification.

The determination position storage 17 according to the first modification not only stores a determination position (latitude and longitude) but also a predetermined direction (azimuth direction) with respect to the determination position.

The position comparator 18 according to the first modification determines whether the current position of the own vehicle acquired by the position acquisition unit 12 is the determination position and whether the current direction of the own vehicle acquired by the position acquisition unit 12 is the predetermined direction with respect to the determination position. Then, the position comparator 18 outputs a table coincidence flag to the processing flag generator 19 and outputs a table number of the determination position to the filter processor 20 in a case in which the position comparator 18 determines that the current position of the own vehicle is the determination position and the current direction of the own vehicle is the predetermined direction with respect to the determination position. Note that the position comparator 18 does not output the table coincidence flag and the table number in a case in which the position comparator 18 determines that the current direction of the own vehicle is not the predetermined direction with respect to the determination position even when the current position of the own vehicle is the determination position.

As a result, the processing flag generator 19 does not output the processing flag to the filter processor 20 in the case in which the current position of the own vehicle acquired by the position acquisition unit 12 is not the predetermined direction with respect to the determination position even when the ON signal is supplied to the lighting device 91 and the current position of the own vehicle is the determination position.

The navigation device 1 according to the first modification as described above does not perform the failure determination of the lighting device 91 in the case in which the current direction of the own vehicle is not the predetermined direction with respect to the determination position. This can further limit the conditions in which the video used for the failure determination of the lighting device 91 is acquired, resulting in a reduced influence of the ambient environments. Thus, the accuracy of the failure determination of the lighting device 91 on the basis of the video can be increased. In the description above, the current position of the own vehicle is assumed as the latitude and the longitude, but the current position is not limited to this, and another element such as a current altitude of the own vehicle may be further added.

<Second Modification>

FIG. 13 is a block diagram showing a functional configuration of a navigation device 1 according to a second modification. The navigation device 1 in FIG. 13 includes a determination position decision unit 24 in addition to the structural components of the navigation device 1 in FIG. 4. The determination position decision unit 24 is achieved as the function of the processor 84 in FIG. 1 similarly to the determination unit 13.

FIG. 14 is a block diagram showing a configuration of the determination position decision unit 24 according to the second modification. The determination position decision unit 24 decides, on the basis of a luminance of a video of the non-illumination target area 72 of the video acquired by the video acquisition unit 11 at each of positions being the current position and the number of times the own vehicle passes each of the positions, which position should be the determination position among the above-mentioned positions. The determination position decision unit 24 in FIG. 14 includes a non-illumination area luminance measuring unit 24a, a first comparator 24b, a counter 24c, and a second comparator 24d.

The non-illumination area luminance measuring unit 24a measures the luminance of the video of the non-illumination target area 72 (FIG. 2) of the video acquired by the video acquisition unit 11. The first comparator 24b determines whether the luminance measured by the non-illumination area luminance measuring unit 24a is less than or equal to a first predetermined threshold value. The non-illumination area luminance measuring unit 24a and the first comparator 24b are substantially the same as the non-illumination area luminance determination unit 15, so that the non-illumination area luminance determination unit 15 may be applied to the non-illumination area luminance measuring unit 24a and the first comparator 24b.

The counter 24c counts the number of times the luminance measured by the non-illumination area luminance measuring unit 24a is less than or equal to the first predetermined threshold value at each of positions (current position acquired by the position acquisition unit 12). If the luminance measured by the non-illumination area luminance measuring unit 24a is greater than the first predetermined threshold value at each of the positions (current position acquired by the position acquisition unit 12), the counter 24c may reduce the number of times that has been counted.

The second comparator 24d determines whether the number of times counted by the counter 24c is greater than or equal to a second predetermined threshold value. A position in which it is determined that the number of times is greater than or equal to the second threshold value is output as a position that should be the determination position to the determination position storage 17. The determination position storage 17 stores the position decided by the determination position decision unit 24 as the determination position where the failure determination is performed.

The navigation device 1 according to the second modification as described above can automatically register, as measurement positions, places where the own vehicle frequently passes, such as a commuting route and roads around home, except for bright places such as tunnels and cities. Therefore, the determination position where the failure determination is performed can be optimized.

Figure 15:
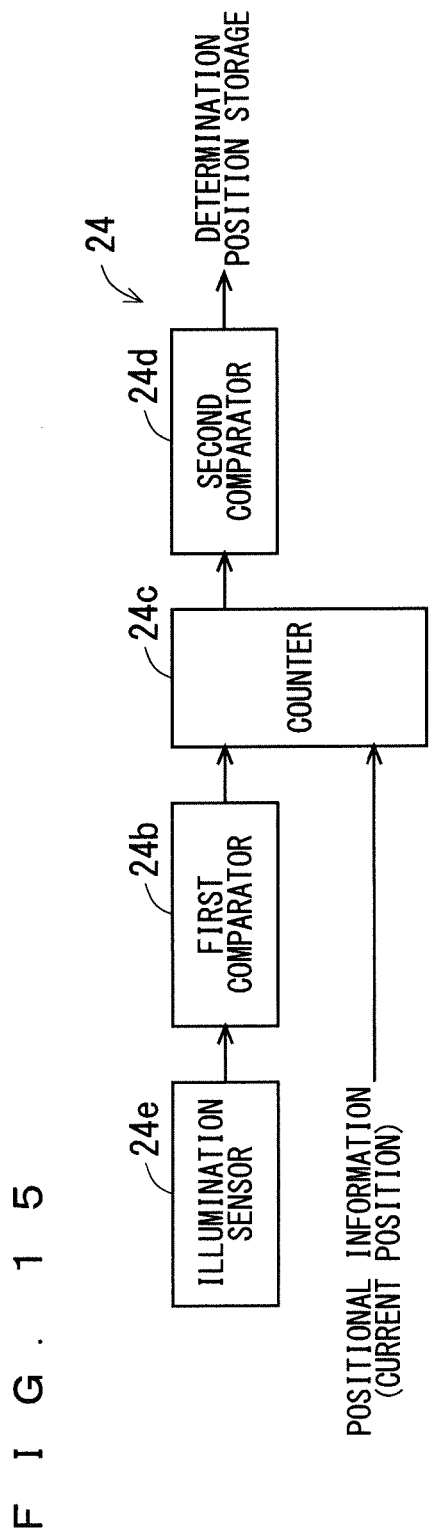
FIG. 15 is a block diagram showing another configuration of the determination position decision unit according to the second modification.

FIG. 15 is a block diagram showing another configuration of the determination position decision unit 24. The determination position decision unit 24 in FIG. 15 includes an illumination sensor 24e mounted on the own vehicle (vehicle-mounted illumination sensor) instead of the non-illumination area luminance measuring unit 24a of the determination position decision unit 24 in FIG. 14.

The illumination sensor 24e acquires an intensity of illumination of surroundings of the own vehicle. The surroundings of the own vehicle may be any of the front, the rear, and the sides of the own vehicle.

Operations of the first comparator 24b, the counter 24c, and the second comparator 24d in FIG. 15 are similar to those in FIG. 14 except for that a processed target is changed from the luminance of the video of the non-illumination target area 72 to the intensity of illumination acquired by the illumination sensor 24e.

The determination position decision unit 24 in FIG. 15 having such a configuration described above decides, on the basis of the intensity of illumination of the surroundings of the own vehicle acquired by the illumination sensor 24e at each of the positions being the current position and the number of times the own vehicle passes each of the positions, which position should be the determination position among the above-mentioned positions. The determination position storage 17 stores the position decided by the determination position decision unit 24 as the determination position where the failure determination is performed. The configuration in FIG. 15 can optimize the determination position where the failure determination is performed similarly to the configuration in FIG. 14.

The device configured to automatically store (register) the determination position in the determination position storage 17 is described above. However, this is not restrictive, and the user may operate the navigation device 1 with reference to a registration screen displayed on the display 95 to store a desired position (such as a parking lot at home) as the determination position in the determination position storage 17.

<The Other Modifications>

In the description above, it is assumed that the video receiving device 81 includes the interface or the like. However, the video receiving device 81 is not limited to the configuration, and may include, for example, the camera 94 or the like. Also in the description above, it is assumed that the position calculating device 82 includes the GPS receiving device 82a and the sensor 82b. However, the position calculating device 82 is not limited to the configuration, and may include, for example, the interface or the like.

Furthermore, in the description above, the determination unit 13, the luminance converter 14, the reference value acquisition unit 23, and the determination position decision unit 24 are achieved by the processor 84 in FIG. 1 operating in response to the software programs stored in the memory 83 or the like. Instead, however, the determination unit 13, the luminance converter 14, the reference value acquisition unit 23, and the determination position decision unit 24 may be achieved by a signal processing circuit in which a hardware electrical circuit achieves the operations. The term "processing circuit" may also be used instead of the term "unit" under the concept that a software determination unit 13, a software luminance converter 14, a software reference value acquisition unit 23, and a software determination position decision unit 24 are combined with a hardware determination unit 13, a hardware luminance converter 14, a hardware reference value acquisition unit 23, and a hardware determination position decision unit 24.

The navigation device 1 described in the first embodiment or the like includes not only a vehicle-mountable navigation device but also a navigation system formed as a system by appropriately combining a portable navigation device (PND), a communication terminal, functions of applications installed in the PND and the communication terminal, and a server. In this case, each of the functions or each of the structural components in the navigation device 1 described above may be disposed in a distributed manner in each piece of equipment that constructs the above-mentioned system, or may be disposed in a concentrated manner in any piece of equipment.

Figure 16:
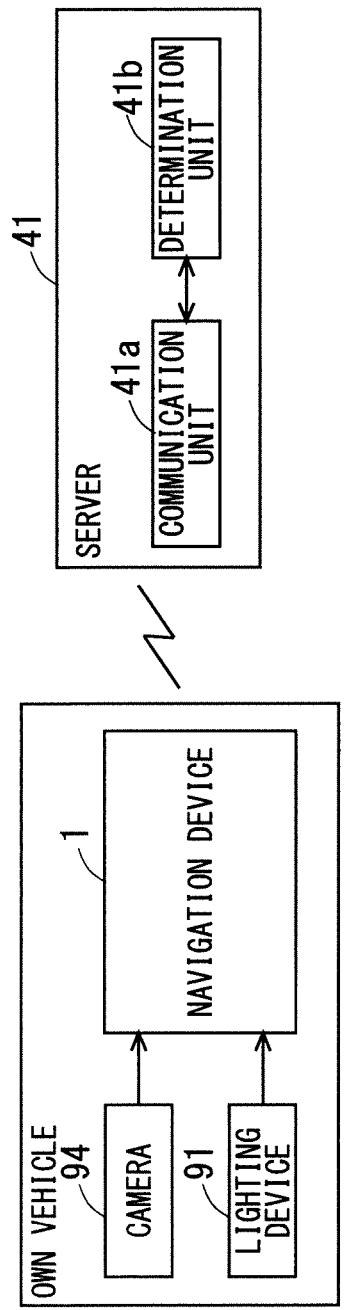
FIG. 16 is a block diagram showing a configuration of a server according to the other modification.

FIG. 16 is a block diagram showing a configuration of a server 41 according to this modification. The server 41 in FIG. 16 includes a communication unit 41a and a determination unit 41b and is capable of wirelessly communicating with the navigation device 1 of the own vehicle. The own vehicle includes the above-mentioned lighting device 91 and camera 94 that are connected to the navigation device 1.

The communication unit 41a (the video acquisition unit and the position acquisition unit) receives a video of an area including the illumination target area of the lighting device 91, the information indicating whether the ON signal is supplied to the lighting device 91, and the current position of the own vehicle through wireless communication with the navigation device 1.

The determination unit 41b has the same function as that of the above-mentioned determination unit 13 by a processor, which is not shown, of the server 41 executing programs stored in a storage device, which is not shown, of the server 41. In other words, the determination unit 41b determines whether the lighting device 91 is faulty on the basis of a video of the illumination target area of the video received by the communication unit 41a in cases in which the ON signal is supplied to the lighting device 91 and the current position of the own vehicle is the determination position. The communication unit 41a then transmits the determination result of the determination unit 41b to the navigation device 1.

The server 41 having such a configuration can limit the position in which the video used for the failure determination of the lighting device 91 is acquired to the determination position similarly to the navigation device 1 described in the first and second embodiments, resulting in a reduced influence of the ambient environments. Thus, the accuracy of the failure determination of the lighting device 91 on the basis of the video can be increased.

FIG. 17 is a block diagram showing a configuration of a communication terminal 46 according to this modification. The communication terminal 46 in FIG. 17 includes a communication unit 46a similar to the communication unit 41a and a determination unit 46b similar to the determination unit 41b, and is capable of wirelessly communicating with the navigation device 1 of the own vehicle. For example, portable terminals such as cellular phones, smartphones, and tablets that are carried by a driver of the own vehicle are applied to the communication terminal 46. The communication terminal 46 having such a configuration can also increase the accuracy of the failure determination of the lighting device 91 on the basis of the video similarly to the navigation device 1 described in the first and second embodiments as well as the server 41 in FIG. 16.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood the numerous modifications and variations can be devised without departing from the scope of the invention.

DESCRIPTION OF NUMERALS 1 navigation device; 11 video acquisition unit; 12 position acquisition unit; 13 determination unit; 15 non-illumination area luminance determination unit; 17 determination position storage; 20 filter processor; 21 illumination area-average luminance acquisition unit; 22 determination processor; 23 reference value acquisition unit; 24 determination position decision unit; 71 illumination target area; 72 non-illumination target area; 73a, 73b calculated target area; 81 video receiving device; 82 position calculating device; 91 lighting device.

The invention claimed is:

1. A lighting failure determination apparatus to determine a failure in a vehicle-mounted lighting device capable of illuminating the outside of a vehicle, comprising:
a video receiver to acquire a video of an area including an illumination target area of said lighting device;
a position receiver to acquire a current position of said vehicle; and
a determination controller to determine whether said lighting device is faulty on the basis of a video of said illumination target area of said video acquired by said video receiver in cases in which an ON signal is supplied to said lighting device and said current position acquired by said position receiver is a predetermined determination position where determination of said failure should be performed, wherein
said position receiver further acquires a current direction of said vehicle, and
said determination controller does not perform said determination in a case in which the current direction of said vehicle acquired by said position receiver is not a predetermined direction with respect to said predetermined determination position even when said ON signal is supplied to said lighting device and said current position acquired by said position receiver is said predetermined determination position.

2. The lighting failure determination apparatus according to claim 1, wherein
said area further includes a non-illumination target area of said lighting device, and
said determination controller does not perform said determination in a case in which a luminance of a video of said non-illumination target area of said video acquired by said video receiver is greater than a predetermined threshold value even when said ON signal is supplied to said lighting device and said current position acquired by said position receiver is said predetermined determination position.

3. The lighting failure determination apparatus according to claim 1, further comprising a determination position decision controller to decide, on the basis of an intensity of illumination around said vehicle acquired by a vehicle-mounted illumination sensor at each of positions being said current position and the number of times said vehicle passes each of said positions, which position should be said predetermined determination position among said positions.

4. The lighting failure determination apparatus according to claim 3, further comprising a determination position storage to store each of positions decided by said determination position decision controller as said predetermined determination position.

5. The lighting failure determination apparatus according to claim 1, wherein said area further includes a non-illumination target area of said lighting device, and said lighting failure determination apparatus further comprises a determination position decision controller to decide, on the basis of a luminance of a video of said non-illumination target area of said video acquired by said video receiver at each of positions being said current position and the number of times said vehicle passes each of said positions, which position should be said predetermined determination position among said positions.

6. The lighting failure determination apparatus according to claim 5, further comprising a determination position storage to store each of positions decided by said determination position decision controller as said predetermined determination position.

7. The lighting failure determination apparatus according to claim 1, wherein said video receiver acquires said video every moment, and said determination controller includes a filter processor to perform filter processing with a low-pass filter in a time direction on a luminance of a plurality of pixels in said video acquired every moment by said video receiver in the cases in which said ON signal is supplied to said lighting device and said current position acquired by said position receiver is said predetermined determination position, an average luminance receiver to acquire an average value of said luminance, on which said filter processing is performed, of pixels in a predetermined area of said illumination target area, and a determination processor to determine whether said lighting device is faulty on the basis of said average value acquired by said average luminance receiver and a predetermined reference value.

8. The lighting failure determination apparatus according to claim 7, wherein said determination controller further includes a reference value receiver to acquire said reference value, in a case in which said average value of units of a predetermined plurality of frames before the present acquired by said average luminance receiver falls within a predetermined range, on the basis of said average value of the units of said predetermined plurality of frames.

9. The lighting failure determination apparatus according to claim 7, wherein said lighting device includes lamps of a plurality of kinds, and said predetermined area is defined for each kind of said lamps.

10. A lighting failure determination method for determining a failure in a vehicle-mounted lighting device capable of illuminating the outside of a vehicle, comprising:

acquiring a video of an area including an illumination target area of said lighting device;

acquiring a current position of said vehicle;

acquiring a current direction of said vehicle; and determining whether said lighting device is faulty on the basis of a video of said illumination target area of said video acquired in cases in which an ON signal is supplied to said lighting device and said current position acquired is a predetermined determination position where determination of said failure should be performed, wherein said determination is not perform in a case in which the current direction of said vehicle is not a predetermined direction with respect to said predetermined determination position even when said ON signal is supplied to said lighting device and said acquired current position is said predetermined determination position.

* * * * *